US011117456B2

(12) United States Patent
Krefta et al.

(10) Patent No.: US 11,117,456 B2
(45) Date of Patent: Sep. 14, 2021

(54) SEALING ARRANGEMENT FOR A MOTOR VEHICLE WINDOW, COMPOSITE SEAL, AND METHOD FOR PRODUCING A COMPOSITE SEAL

(71) Applicant: Cooper Standard GmbH, Lindau (DE)

(72) Inventors: Tomasz Krefta, Lindau (DE); Lutz Haupt, Lindau (DE)

(73) Assignee: COOPER STANDARD GMBH, Lindau (DE)

( * ) Notice: Subject to any disclaimer, the term of this patent is extended or adjusted under 35 U.S.C. 154(b) by 111 days.

(21) Appl. No.: 16/361,785

(22) Filed: Mar. 22, 2019

(65) Prior Publication Data

US 2019/0217693 A1 Jul. 18, 2019

Related U.S. Application Data

(63) Continuation of application No. PCT/EP2017/071842, filed on Aug. 31, 2017.

(30) Foreign Application Priority Data

Sep. 23, 2016 (DE) ...................... 10 2016 117 957.4

(51) Int. Cl.
*E06B 7/16* (2006.01)
*B60J 10/76* (2016.01)
(Continued)

(52) U.S. Cl.
CPC ............. *B60J 10/76* (2016.02); *B60J 5/0402* (2013.01); *B60J 10/21* (2016.02)

(58) Field of Classification Search
CPC ........... B60J 10/76; B60J 10/21; B60J 5/0402
(Continued)

(56) References Cited

U.S. PATENT DOCUMENTS

| | | | |
|---|---|---|---|
| 8,434,267 B2 * | 5/2013 | Bocutto | B60J 10/70 49/479.1 |
| 8,479,449 B2 * | 7/2013 | Titz | B60J 10/78 49/440 |

(Continued)

FOREIGN PATENT DOCUMENTS

| | | |
|---|---|---|
| DE | 4128845 A1 | 3/1993 |
| EP | 2676825 A2 | 12/2013 |
| GB | 2353553 A | 2/2001 |

OTHER PUBLICATIONS

International Search report issued for PCT/EP2017/071842 dated Jan. 5, 2018.

(Continued)

*Primary Examiner* — Jerry E Redman
(74) *Attorney, Agent, or Firm* — Reising Ethington P.C.

(57) ABSTRACT

A seal arrangement for sealing a corner region of a window against a vehicle body component of a motor vehicle. The seal arrangement defines a seal plane, a first seal axis and a second seal axis which extends transversely with respect to the latter. A fastening section serves for fastening to the vehicle body component. A seal section has a sealing lip which can be deflected elastically transversely with respect to the seal plane when the corner region of the window comes into contact with the sealing lip, and which extends arcuately from the first seal axis to the second seal axis. The sealing lip is configured as a molded sealing lip over its entire arcuate extent.

8 Claims, 3 Drawing Sheets

(51) Int. Cl.
*B60J 10/21* (2016.01)
*B60J 5/04* (2006.01)

(58) Field of Classification Search
USPC .......................................................... 49/479.1
See application file for complete search history.

(56) References Cited

U.S. PATENT DOCUMENTS

| | | | | |
|---|---|---|---|---|
| 8,646,213 | B2* | 2/2014 | Suzuki | B60J 10/78 |
| | | | | 49/479.1 |
| 2002/0062596 | A1* | 5/2002 | Palicki | B60J 10/30 |
| | | | | 49/441 |
| 2002/0139054 | A1* | 10/2002 | Schlachter | B60J 10/30 |
| | | | | 49/479.1 |
| 2008/0265615 | A1* | 10/2008 | Eguchi | B60J 1/08 |
| | | | | 296/146.2 |
| 2009/0021044 | A1* | 1/2009 | Maab | B60J 10/21 |
| | | | | 296/146.2 |
| 2009/0108625 | A1* | 4/2009 | Minami | B60J 10/277 |
| | | | | 296/146.2 |
| 2016/0214471 | A1 | 7/2016 | Bessho et al. | |
| 2019/0061486 | A1* | 2/2019 | Sugawa | B60J 10/26 |

OTHER PUBLICATIONS

English Translation of the International Preliminary Report on Patentability issued for PCT/EP2017/071842 dated Mar. 26, 2019.

* cited by examiner

SEALING ARRANGEMENT FOR A MOTOR VEHICLE WINDOW, COMPOSITE SEAL, AND METHOD FOR PRODUCING A COMPOSITE SEAL

CROSS-REFERENCE TO RELATED APPLICATIONS

This is a continuation application of international patent application PCT/EP2017/071842, filed Aug. 31, 2017, which claims the priority of German patent application DE 10 2016 117 957, filed Sep. 23, 2016, the entire content of these earlier applications being incorporated herein by reference.

BACKGROUND

The present application relates to a seal arrangement for sealing a corner region of a window against a vehicle body component of a motor vehicle, the seal arrangement defining a seal plane, a first seal axis and a second seal axis which extends transversely with respect to the latter, having a fastening section for fastening to the vehicle body component, and having a seal section which has a sealing lip which can be deflected elastically transversely with respect to the seal plane when the corner region of the window comes into contact with the sealing lip, and which extends arcuately from the first seal axis to the second seal axis.

Furthermore, the present application relates to a composite seal which comprises a seal arrangement of this type, and to a method for producing a composite seal for sealing a window against a vehicle body component of a motor vehicle, the composite seal defining a seal plane, a first seal axis and a second seal axis which extends transversely with respect to the latter.

For dynamically sealing window panes, it is known to extrude profile seals. The extruded profile seals can then be laid along bends. It is possible in corner regions to cut two profile seals which extend along different seal axes with a miter and to allow them to abut one another. On account of tolerances, however, the appearance of a corner region of this type of a seal arrangement is not always satisfactory. Furthermore, it is known to bend away profile seals of the above-described type in each case somewhat in a corner region, with the result that the profile seals meet in the middle. Subsequently, the extruded profile seals are laid into an injection mold, and a fastening section is molded onto the two profile seals which abut one another, which fastening section is consequently realized as a molded fastening section. It is not always simple here to fix the ends of the profile seals within the mold in a suitable manner. As a consequence, variations with regard to the relative sealing lip positions can occur from molding operation to molding operation.

It is also conceivable to provide an extruded seal profile exclusively for the corner region. In this case, an extruded profile section of this type would be inserted into a mold, in order subsequently to mold a fastening section on it. There is always the problem in the case of curved extruded profile seals, however, that a seal lip which can be deflected elastically transversely with respect to the seal plane either stands up with respect to a non-curved state or is possibly deflected in advance on account of the curve. In other words, the function of a sealing lip of an extruded profile strip of this type can differ in a region in which the profile strip extends along its longitudinal axis and a region in which it is curved. Changes of this type of the sealing lip position relative to the seal plane can lead to noise problems.

In so far as extruded profile seals are to abut one another in a bend region, the profile seals have to be trimmed in a relatively complicated manner at their ends which point toward one another. In other words, the trimming possibly does not take place perpendicularly with respect to a longitudinal axis of the profile seal. Trimming slightly obliquely with respect to a longitudinal axis of the profile seal can possibly be necessary.

SUMMARY

Against this background, it is an object of the present application to specify an improved seal arrangement for sealing a corner region of a window, an improved composite seal, and an improved method for producing a composite seal.

The above object may be achieved in the case of the seal arrangement which is mentioned at the outset by virtue of the fact that the sealing lip is configured as a molded sealing lip over its entire arcuate extent.

Furthermore, the above object may be achieved by way of a composite seal having a first extruded profile seal which extends along a first seal axis, having a second extruded profile seal which extends along a second seal arrangement, and having a seal arrangement of the type according to the invention.

Finally, the above object may be achieved by way of a method for producing a composite seal for sealing a window against a vehicle body component of a motor vehicle, the composite seal defining a seal plane, a first seal axis and a second seal axis which extends transversely with respect to the latter, having the steps, (i) molding a seal arrangement, the seal arrangement having a fastening section for fastening to the vehicle body component, and a seal section with a sealing lip which can be deflected elastically transversely with respect to the seal plane and extends arcuately from the first seal axis to the second seal axis, (ii) extruding a profile seal which has a profile seal lip, and (iii) connecting the seal arrangement and the profile seal in such a way that the sealing lip of the seal arrangement and the profile seal lip of the profile seal adjoin one another.

In the case of the seal arrangement according to the present application, the sealing lip is configured as a molded sealing lip over its entire arcuate extent. A molded sealing lip is understood to mean a sealing lip which is produced by way of a discontinuous molding method. The molding method which is used is preferably an injection molding method. The molding method can, however, also be a transfer molding method, for example a compression transfer molding method. A press method within the context of a compression molding method (press molding) is also to fall within the term "molding method" in the present case.

The sealing lip can have a defined position over the entire arcuate extent by way of the measure of configuring the sealing lip over its entire arcuate extent as a molded part. Furthermore, no interfaces which have to be cut in a complicated manner or processed in some other way and which can lead to esthetic problems with regard to the joints or seams which are produced result in the arcuate region.

Overall, this thus results in an improved noise behavior and also an improved appearance.

Furthermore, it is advantageous that the seals which adjoin the molded sealing lip and can be configured, for example, as extruded profile seals do not necessarily have to have the same profile. In other words, for example, a horizontal extruded profile seal can be equipped with a different profile than a vertical extruded profile seal. In this case, the sealing lip, or the seal section overall, is equipped with different profiles in the region of the arc ends, which different profiles are configured for direct connection to the respective different profile seals.

As a consequence, this results in a higher variability with regard to the composite seal arrangements which can be produced by way of the seal arrangement.

It is preferred if the entire seal section is configured as a molded seal section over the entire arcuate extent. Furthermore, it is preferred if the seal section and the fastening section are both produced using the molding method, with the result that the seal arrangement overall is configured as a molded seal arrangement.

In the case of the composite seal, precisely one seal arrangement can preferably extend between the first extruded profile seal and the second extruded profile seal. It is also generally conceivable that two or more seal arrangements are arranged so as to adjoin one another in the arcuate direction over the arcuate extent between the first extruded profile seal and the second extruded profile seal.

The first and the second seal axis are preferably arranged at an angle of greater than 45° with respect to one another, in particular at an angle of greater than 60°, in particular at an angle of greater than 70°. The seal plane preferably runs parallel to a plane or is formed by a plane which is defined by the first seal axis and the second seal axis.

The seal arrangement is designed, in particular, for installation in a door frame adjacently with respect to the B-pillar. It is preferred overall if the seal arrangement is configured for sealing a corner region of a movable window of a door or of a hatch of a motor vehicle.

The object is therefore achieved completely.

In accordance with one preferred embodiment, the molded sealing lip is configured in one piece, that is to say is preferably produced from a homogeneous material in a single stage molding method.

In accordance with a further preferred embodiment, the molded sealing lip extends in a collar-like manner with respect to a sealing lip carrier of the seal section.

Here, the molded sealing lip preferably extends at an angle in a range of from 20° to 60°, in particular in a range of from 30° to 50° in relation to the sealing lip carrier which can preferably be of plate-like configuration and which is preferably oriented approximately parallel to the seal plane.

When the corner region of the window is in contact with the molded sealing lip, the molded sealing lip which extends in a collar-like manner with respect to the sealing lip carrier can be deflected, to be precise in the direction of the sealing lip carrier, until it is arranged virtually parallel to the latter, when the window is sealed completely against the vehicle body component, that is to say, for example, the window is closed.

The molded sealing lip can be produced from TPE, that is to say a thermoplastic elastomer, such as TPE-O or TPE-U or TPE-V.

It is particularly preferred if the molded sealing lip is produced from EPDM, that is to say an ethylene propylene diene rubber.

It is preferred if the seal arrangement is produced in one piece from EPDM, or from a TPE material. It is generally also conceivable that the seal arrangement is configured as a hybrid seal arrangement, certain sections being produced, for example, from EPDM and other sections being produced from TPE, or from different TPE compounds or from different EPDM compounds.

In accordance with a further preferred embodiment, the molded seal lip has a seal face, the seal face having a coating, in particular a flocked coating.

As a result, the surface appearance of the seal can be improved. The noise behavior can possibly also be improved, since an improved sliding behavior between the sealing lip and the window can be realized by way of the coating, in particular by way of the flocked coating.

In the case of the composite seal, it is preferred if the molded seal lip is connected to an extruded profile seal in the region of at least one arc end of its arcuate extent, a seal face of the molded sealing lip and a seal face of the profile seal lip of the profile seal being provided with a homogeneous coating.

Here, the coating, in particular the flocked coating, can extend homogeneously over the profile seal lip and, beyond the connecting gap, over the sealing lip of the seal arrangement.

In particular, the coating operation can take place after the extruded profile seal and the seal arrangement have been connected to one another. In some cases, the extruded profile seal can also be molded in the course of a molding method using the injection molding method during the production of the seal arrangement, with the result that the composite seal is subsequently in one piece and can be provided in a simple way with a homogeneous coating.

Overall, furthermore, it is advantageous if the molded sealing lip has a seal profile at at least a first arc end of its arcuate extent, which seal profile defines a profile longitudinal axis, the first arc end extending at a right angle with respect to the profile longitudinal axis.

In this way, an extruded profile seal can be attached to the first arc end, which extruded profile seal is trimmed perpendicularly with respect to its longitudinal axis in a simple way. As a result of the configuration of the first arc end at a right angle with respect to the profile longitudinal axis, an excellent connection or seam can also be realized in the case of perpendicular trimming of the extruded profile seal.

It goes without saying that the features which are mentioned in the above text and are still to be described in the following text can be used not only in the respectively specified combination, but rather also in other combinations or on their own, without departing from the scope of the present invention.

BRIEF DESCRIPTION OF THE SEVERAL VIEWS OF THE DRAWING

Exemplary embodiments are shown in the drawing and will be described in greater detail in the following description. In the drawing.

EMBODIMENTS

Figure 1:
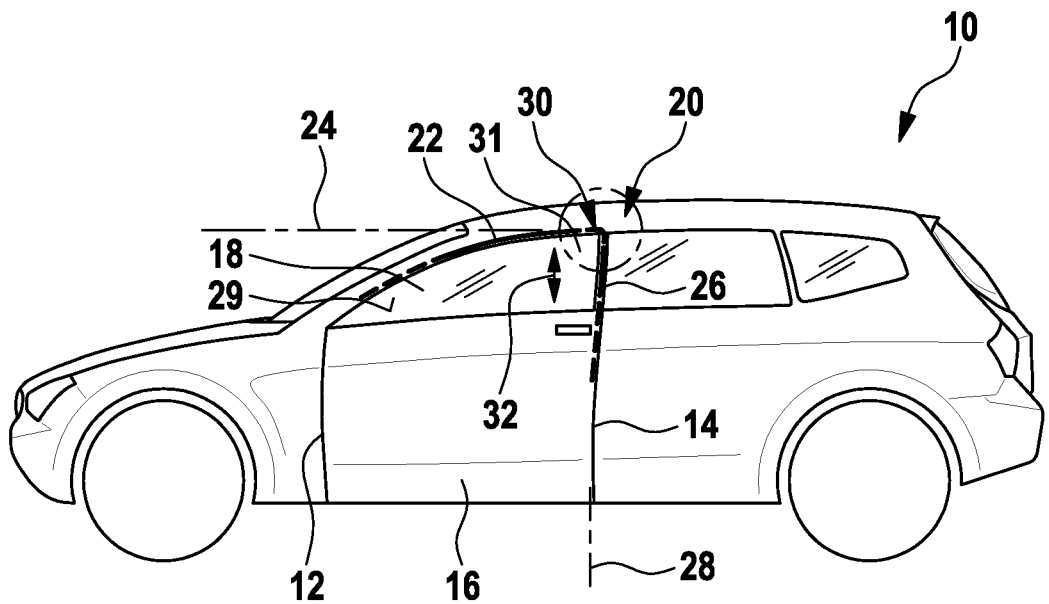
FIG. 1 shows a diagrammatic side view of a motor vehicle.

FIG. 1 diagrammatically shows a motor vehicle which is denoted in general by 10.

The motor vehicle 10 has an A-pillar 12 and a B-pillar 14. A front door 16 with a movable front door window 18 is mounted pivotably between the A-pillar 12 and the B-pillar 14.

A composite seal 20 is provided for sealing the front door window 18 against the front door 16. Said composite 20 comprises a first extruded profile seal 22 which is arranged and oriented substantially horizontally along a first seal axis 24. The first extruded profile seal 22 serves to seal an upper side edge of the front door window 18. Furthermore, the composite seal 20 comprises a second extruded profile seal 26 which is arranged and oriented substantially vertically along a second seal axis 28. The second seal axis 28 is oriented at an angle of greater than 45°, in particular greater than 60°, in particular greater than 70° in relation to the first seal axis 24. The second extruded profile seal 26 serves substantially for sealing a side edge of the front door window 18, to be precise in the region of the B-pillar 14.

The first seal axis 24 and the second seal axis 28 define a seal plane 29 which is preferably oriented substantially parallel to a plane of the front door window 18.

The composite seal 20 has, furthermore, a seal arrangement 30 for sealing a corner region 31 of the front door window 18 in the region of the B-pillar 14 against the front door 16.

The seal arrangement 30 extends arcuately from the first extruded profile seal 22 and its first seal axis 24 in the direction of the second extruded profile seal 26 and to the second seal axis 28. The seal arrangement 30 is configured as a molded sealing lip over its entire arcuate extent, that is to say is produced by way of a discontinuous molding or forming method, and, in particular, is not produced by way of extrusion. Here, in particular, a sealing lip which comes into contact with the front door window 18 is configured as a molded sealing lip and extends arcuately.

Furthermore, FIG. 1 diagrammatically indicates a window movement direction 32. The window movement direction 32 is oriented substantially parallel to the second seal axis 28.

In the present case, the seal arrangement 30 is arranged in the region of a B-pillar 14 of the motor vehicle 10, to be precise in the region of the front door window 18. A seal arrangement 30 of the above-described type can also, however, be arranged in the region of a rear door window or in the region of a rear hatch window or the like, the window, in particular, being a movable window. Here, the seal arrangement 30 is arranged, in particular, for arranging in a corner region, as indicated in FIG. 1 by way of dashed circles in the region of the rear door window (not designated in greater detail).

Figure 2:
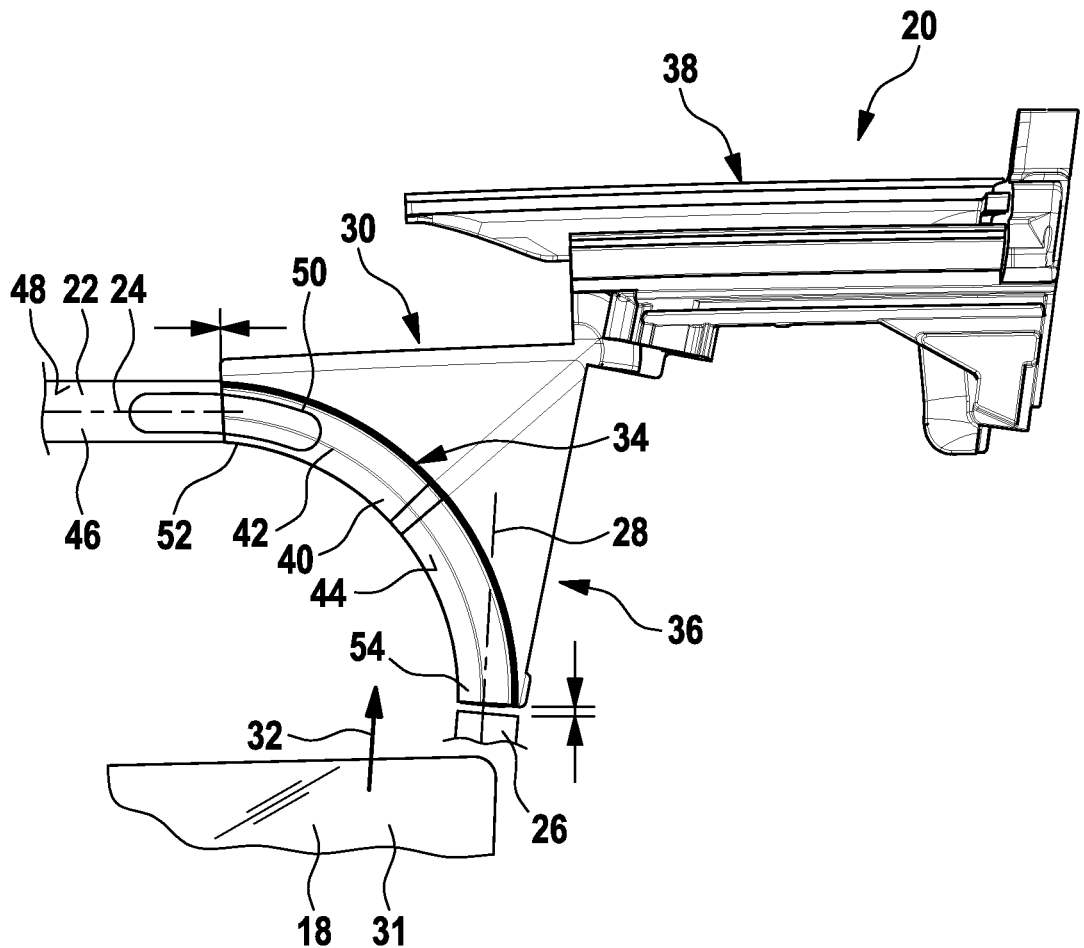
FIG. 2 shows a diagrammatic plan view of one embodiment of a seal arrangement.

FIG. 2 shows one embodiment of a composite seal 20 which can be installed into the motor vehicle from FIG. 1. With regard to the construction and method of operation, the composite seal 20 corresponds to the composite seal 20 from FIG. 1. Identical elements are specified by way of identical designations.

It can be seen that the seal arrangement 30 of the composite seal 20 has a seal section 34 and a fastening section 36. Furthermore, as shown in FIG. 2, the seal arrangement 30 can additionally comprise an integration section 38 which is connected to the fastening section 36 and which can preferably be integrated into a frame of the front door 16 in such a way that a part of it can serve as a seal against a door frame.

The seal section 36 of the seal arrangement 30 has a sealing lip 40 which extends arcuately, as shown at 42. The sealing lip 40 provides an arcuate seal face 44. The sealing lip 40 preferably extends in a collar-like manner with respect to a sealing lip carrier (not designated in greater detail in FIG. 2) of the seal section 34, and can be deflected in a direction transversely with respect to the seal plane 29 when the corner region 31 of the front door window 18 comes into contact with the sealing lip 40, in particular into contact with its seal face 44.

Furthermore, FIG. 2 shows that the first profile seal 22 which is oriented along the first seal axis 24 likewise has a profile seal lip 46 which corresponds in terms of form and function to the sealing lip 40. In the same way, the second profile seal 26 can also comprise a profile seal lip of this type, even if this is not shown in greater detail in FIG. 2.

The profile seal lip 46 has a seal face 48 which forms a homogeneous seal face together with the seal face 44 of the sealing lip 40. As a consequence, it is possible to provide the seal faces 44, 48 with a common and/or homogeneous coating 50 which extends over an interface between the profile seal 22 and the seal arrangement 30 and can be configured, in particular, as a flocked coating.

The first profile seal 22 is arranged so as to adjoin a first arc end 52 of the seal arrangement 30. The second profile seal 26 is arranged adjacently and so as to adjoin directly with respect to a second arc end 54 of the seal arrangement 30. The arc shape 42 of the seal arrangement 30 or of the sealing lip 40 is selected in such a way that the profile seals 22, 26 can preferably be cut or severed perpendicularly with respect to their profile seal axis 24 and 28, respectively, which considerably simplifies cutting the profile seals 22, 26 to length.

The profile seals 22, 26 are preferably produced by way of an extrusion method and are then cut to length for installation. In contrast, the seal arrangement 30 is preferably configured in a molding step as a molded seal arrangement 30, that is to say is produced by way of a discontinuous method.

The material of the profile seals 22, 26 and/or the material of the seal arrangement 30 are/is preferably EPDM, but can also comprise a thermoplastic elastomer (TPE).

Figure 3:
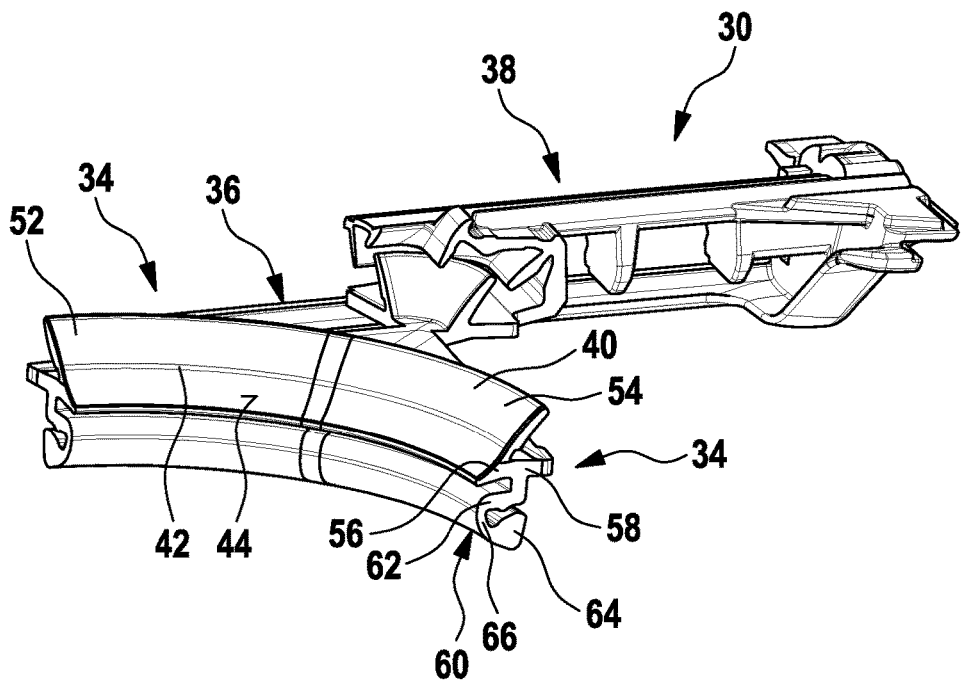
FIG. 3 shows a first perspective view of the seal arrangement from FIG. 2.
Figure 4:
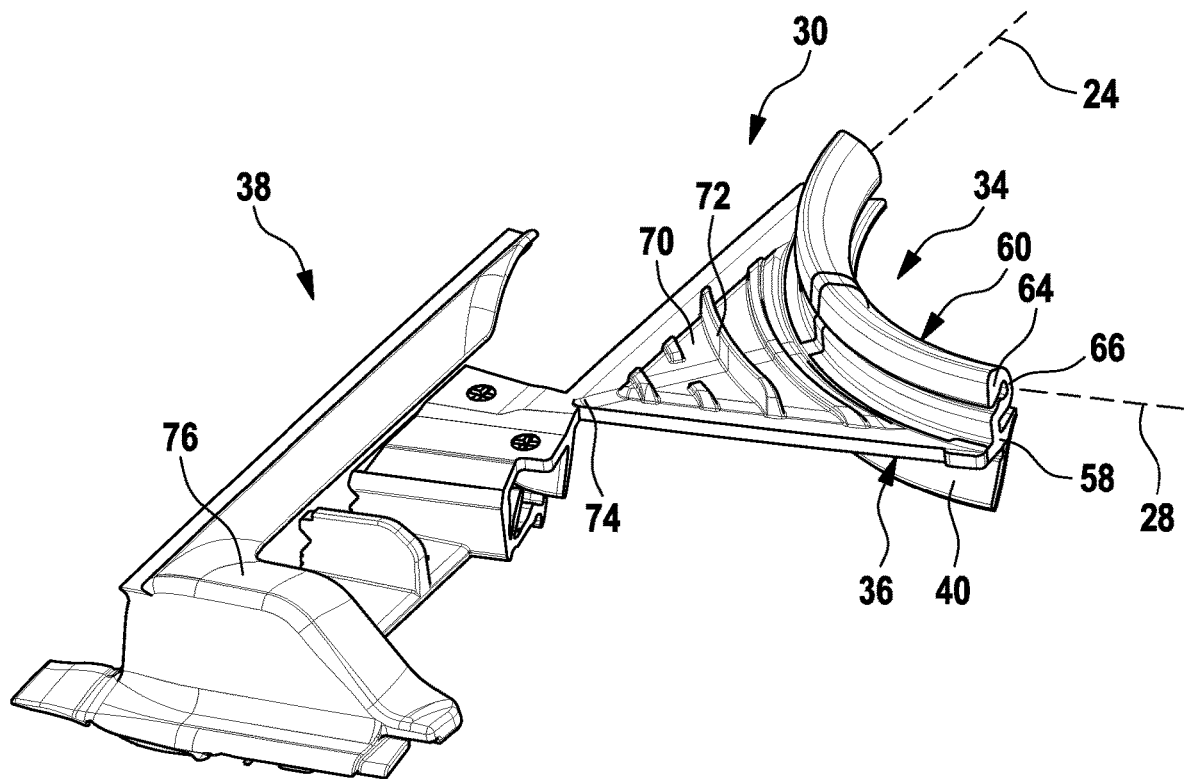
FIG. 4 shows a second perspective view of the seal arrangement from FIG. 2.

FIGS. 3 and 4 show the seal arrangement 30 from FIG. 2 in each case perspectively from the top and from the bottom, respectively.

It can be seen that the seal section 34 of the seal arrangement 30 comprises a seal profile 56. The seal profile 56 has a sealing lip carrier 58 which is preferably oriented substantially parallel to the seal plane 29 and extends arcuately along the arcuate shape 42. The sealing lip 40 is oriented transversely with respect thereto at an angle in relation to the sealing lip carrier 58, and, as a consequence, extends in a collar-like manner with respect to the sealing lip carrier 58.

The fastening section 36 has a fastening arc 60 which is arranged on a side of the sealing lip carrier 58, which side lies opposite the sealing lip 40. The fastening arc 60 forms an arcuate slot, in which a carrier section of the front door 16 can be received, in order to fix the position of the sealing lip carrier 58 in relation to the seal plane 29. For this purpose, the fastening arc 60 has a first fastening web and a second fastening web 64 which are connected by way of a connecting web 66. The webs 62, 64, 66 are in each case likewise of arcuate configuration.

As can be seen in FIG. 4, the sealing lip carrier 48 is connected to a fastening plate 70 of the fastening section 36. The fastening plate 70 is preferably connected in one piece to the sealing lip carrier 58, and is produced from the same material as the seal section 34. The fastening plate 70 extends substantially parallel to the seal plane 29, and tapers substantially in a triangular manner, with the result that side edges of the fastening plate 70 are oriented substantially parallel to the seal axes 24 and 28.

Ribs 72 can be configured on a rear side of the fastening plate 70, which rear side faces away from the sealing lip 40, which ribs 72 can likewise run arcuately and can serve for stabilizing the fastening of the seal arrangement 30 in a vehicle body component such as the front door 16. In particular, the ribs 72 can be configured to counteract forces on the seal arrangement 30 along the seal axes 24 or 28, which forces can occur when the corner region 31 of the window 18 comes into contact with the sealing lip 40.

The side edges (not designated in greater detail) of the fastening plate 70 terminate at a plate corner 74, at which the integration section 38 is connected to the fastening plate 70. The integration section 38 is preferably configured in one piece with the fastening section 36, and, as a consequence, is produced from the same material, in particular from EPDM. A door frame seal section 76 can be configured on a rear side of the integration section 38, by means of which door frame seal section 76 the front door 16 can be sealed against a door frame section of the vehicle body.

Figure 5:
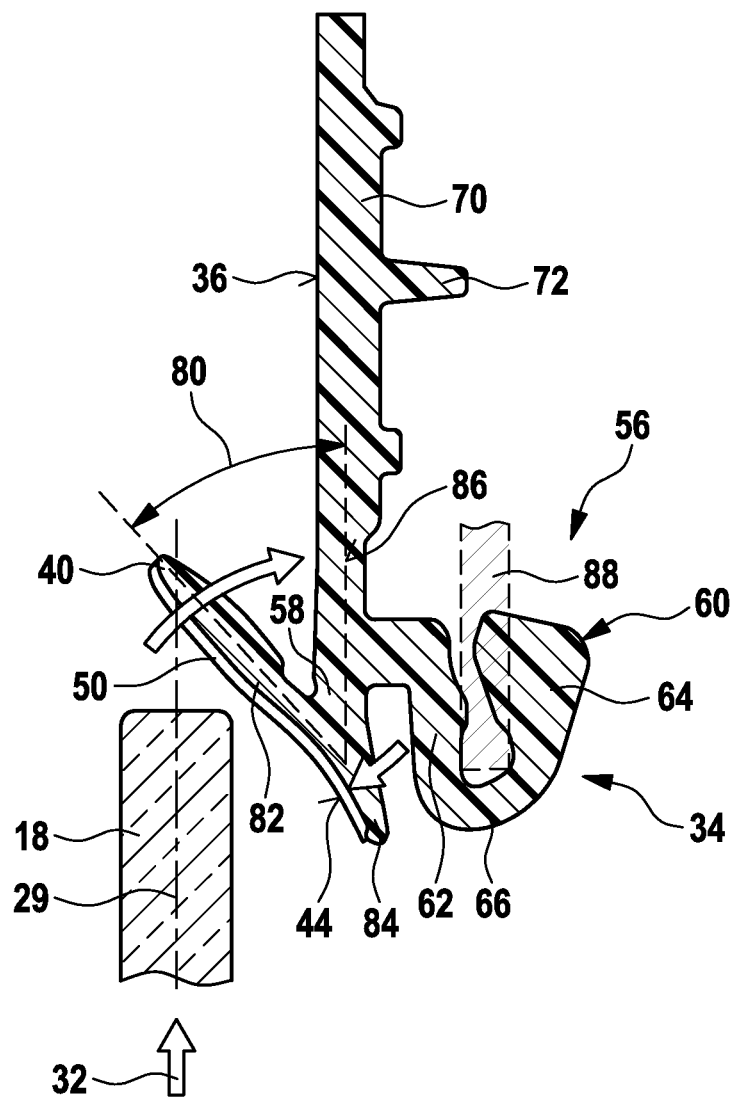
FIG. 5 shows an illustration of a seal profile of the seal arrangement from FIGS. 2-4.

FIG. 5 shows a sectional view of the fastening section 36 and of the seal section 34 and, in particular, shows the seal profile 56.

It can be seen firstly that the sealing lip 40 is generally oriented at a sealing lip angle 80 with respect to a plane of the sealing lip carrier 58 and/or in relation to the seal plane 29. The sealing lip angle 80 can lie, for example, in a range of from 20° to 60°. Furthermore, it can be seen that the sealing lip 40 has a first sealing lip section 82 which extends at the sealing lip angle 80 with respect to the sealing lip carrier 58, to be precise toward a side of the sealing lip carrier 58, which side faces away from the fastening arc 60. Furthermore, the sealing lip 40 comprises a second sealing lip section 84 which extends in the opposite direction with respect to the sealing lip carrier 58. The sealing lip sections 82, 84 form a common seal face 44 which can be provided with a coating 50, as indicated diagrammatically in FIG. 5.

Furthermore, FIG. 5 shows, at 86, a carrier plane of the sealing lip carrier 58, which carrier plane is preferably oriented parallel to the seal plane 29.

The arc section 60 is configured on that side of the sealing lip carrier 58 which lies opposite the first sealing lip section 82. Here, the first fastening web 62 runs substantially parallel to the second sealing lip section 84 and, as a consequence, substantially parallel to the carrier plane 86. The second fastening web 64 runs parallel thereto. The fastening webs 62, 64 are connected to one another via the connecting web 66 which is arranged below the second sealing lip section 84.

A carrier section of a vehicle body component such as a front door 16 is shown at 88, which carrier section engages into the arcuate depression which is formed by way of the fastening arc 60.

Furthermore, FIG. 5 shows the window 18 and its movement direction 32. It can be seen that, when the window 18 is in contact with the first sealing lip section 82, the latter is deflected in the direction of the carrier plane 86. This preferably leads to the second sealing lip section 84 being pivoted in the opposite direction in a corresponding way and preferably likewise being pressed into contact with the window 18.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A composite seal having:
   a first extruded profile seal which extends along a first seal axis and has an axial end and a profile seal lip with a seal face, and
   a seal arrangement for sealing a corner region of a window against a vehicle body component of a motor vehicle, the seal arrangement defining a seal plane, the first seal axis and a second seal axis which extends transversely with respect to the first seal axis, wherein the seal arrangement has a fastening section for fastening to the vehicle body component, and has a seal section which has a sealing lip which can be deflected elastically transversely with respect to the seal plane when the corner region of the window comes into contact with the sealing lip, and which extends arcuately from a first arc end along the first seal axis to a second arc end along the second seal axis,
   wherein the sealing lip is configured as a molded sealing lip over an entire arcuate extent, the first arc end or the second arc end of the molded sealing lip being connected to the axial end of the first extruded profile seal,
   wherein the molded sealing lip is produced from EPDM and has a seal face, and
   wherein the seal face of the molded sealing lip and the seal face of the profile seal lip of the first extruded profile seal make a common sealing surface and are provided with a homogeneous coating that extends over an interface between the first extruded profile seal and the seal arrangement.

2. The composite seal as claimed in claim 1, wherein the molded sealing lip is configured in one piece.

3. The composite seal as claimed in claim 1, wherein the molded sealing lip extends as a collar with respect to a sealing lip carrier of the seal section.

4. The composite seal as claimed in claim 1, wherein the seal section has a sealing lip carrier which is oriented substantially parallel to the seal plane and extends arcuately along the arcuate extent, wherein the sealing lip carrier is connected to a fastening plate of the fastening section, which the fastening plate extends substantially parallel to the seal plane and tapers substantially in a triangular manner so that side edges of the fastening plate are oriented substantially parallel to the first seal axis and the second seal axis, respectively.

5. The composite seal as claimed in claim 4, wherein the side edges of the fastening plate terminate at a plate corner, at which an integration section is connected to the fastening plate.

6. The composite seal as claimed in claim 5, wherein a door frame seal section is arranged on a rear side of the integration section.

7. The composite seal as claimed in claim 1, wherein the molded sealing lip has a seal profile at at least a first arc end of the arcuate extent, which the seal profile defines a profile longitudinal axis, the first arc end extending at a right angle with respect to the profile longitudinal axis.

8. A method for producing a composite seal for sealing a window against a vehicle body component of a motor vehicle, the composite seal having a first extruded profile seal which extends along a first seal axis and has an axial end, and having a seal arrangement for sealing a corner region of a window against a vehicle body component of a motor vehicle, the seal arrangement defining a seal plane, the first seal axis and a second seal axis which extends transversely with respect to the first seal axis, wherein the seal arrangement has a fastening section for fastening to the vehicle body component, and has a seal section which has a sealing lip which can be deflected elastically transversely with respect to the seal plane when the corner region of the window comes into contact with the sealing lip, and which extends arcuately from a first arc end along the first seal axis to a second arc end along the second seal axis, the method having the steps:

provinding EPDM and molding the seal arrangement from the EPDM such that the sealing lip is configured as a molded sealing lip over an entire arcuate extent and has a seal face, extruding of the first extruded profile seal which has a profile seal lip with a seal face, connecting the first arc end or the second arc end of the seal arrangement and the axial end of the first extruded profile seal so that the seal face of the molded sealing lip and the seal face of the profile seal lip adjoin one another to make a common sealing surface, and homogeneously coating an interface between the seal face of the molded sealing lip and the seal face of the profile seal lip.

* * * * *